(12) United States Patent
Prosek

(10) Patent No.: US 10,061,988 B2
(45) Date of Patent: *Aug. 28, 2018

(54) SYSTEMS AND METHODS FOR DEFINING AND ANALYZING VIDEO CLUSTERS BASED ON VIDEO IMAGE FRAMES

(71) Applicant: Facebook, Inc., Menlo Park, CA (US)

(72) Inventor: Ladislav Prosek, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/423,438

(22) Filed: Feb. 2, 2017

(65) Prior Publication Data
US 2017/0147883 A1    May 25, 2017

Related U.S. Application Data

(63) Continuation of application No. 14/682,425, filed on Apr. 9, 2015, now Pat. No. 9,607,223.

(51) Int. Cl.
*G06K 9/62* (2006.01)
*G06K 9/00* (2006.01)

(52) U.S. Cl.
CPC ..... *G06K 9/00758* (2013.01); *G06K 9/00718* (2013.01); *G06K 9/6218* (2013.01)

(58) Field of Classification Search
CPC ........... G06K 9/00718; G06K 9/00758; G06K 9/00744; G06K 9/6218; G06K 9/00261
USPC .......................................... 382/190, 218, 225
See application file for complete search history.

(56) References Cited

U.S. PATENT DOCUMENTS

| | | | |
|---|---|---|---|
| 7,242,809 B2 | 7/2007 | Hunter | |
| 7,734,096 B2 * | 6/2010 | Lee | H04H 60/59 382/100 |
| 8,561,095 B2 * | 10/2013 | Dimitrova | H04N 7/163 725/10 |
| 8,611,422 B1 * | 12/2013 | Yagnik | G06F 17/30784 375/240.01 |
| 8,620,912 B2 | 12/2013 | Wang | |
| 8,935,725 B1 | 1/2015 | Eswaran | |
| 8,953,836 B1 * | 2/2015 | Postelnicu | G06K 9/00758 382/100 |
| 2010/0104261 A1 | 4/2010 | Liu | |
| 2017/0026718 A1 * | 1/2017 | Yabu | H04N 21/8352 |

* cited by examiner

*Primary Examiner* — Daniel Mariam
(74) *Attorney, Agent, or Firm* — Sheppard Mullin Richter & Hampton LLP

(57) ABSTRACT

Systems, methods, and non-transitory computer-readable media can identify a first video represented based on a first set of image frames. A first subset of image frames can be extracted from the first set of image frames. The first subset of image frames can be compared to one or more image frames associated with a collection of video clusters. It can be determined that at least a threshold quantity of image frames in the first subset matches, within an allowable deviation, at least some image frames associated with a first video cluster included the collection of video clusters. The first video cluster can be defined to include the first video.

19 Claims, 9 Drawing Sheets

SYSTEMS AND METHODS FOR DEFINING AND ANALYZING VIDEO CLUSTERS BASED ON VIDEO IMAGE FRAMES

CROSS-REFERENCE TO RELATED APPLICATIONS

This application is a continuation of U.S. patent application Ser. No. 14/682,425, filed Apr. 9, 2015, entitled "SYSTEMS AND METHODS FOR DEFINING AND ANALYZING VIDEO CLUSTERS BASED ON VIDEO IMAGE FRAMES," the entire contents of which are hereby incorporated by reference as if fully set forth herein.

FIELD OF THE INVENTION

The present technology relates to the field of multimedia processing. More particularly, the present technology relates to techniques for defining and analyzing video clusters based on video image frames.

BACKGROUND

Today, people often utilize computing devices or systems for a wide variety of purposes. For instance, users can use their computing devices (or systems) to interact with one another, create content, share information, and access information. In some cases, a user of a computing device may desire to upload media content, such as a video. For example, the user can utilize a camera or other image sensor of the computing device to capture or record a video. In this example, the user can then proceed to upload the video to a social networking system (or service) and share the video via the social networking system.

In some instances, numerous videos can be uploaded to social networking systems every day. Popular or "viral" videos can often be shared online multiple times. However, under conventional approaches, multiple uploads of the same (i.e., or substantially the same) video can occur frequently. Conventional approaches may also store multiple copies of the same video. Accordingly, such conventional approaches to video processing can be inefficient and impractical. Due to these and other reasons, conventional approaches can create challenges for or reduce the overall user experience associated with video processing.

SUMMARY

Various embodiments of the present disclosure can include systems, methods, and non-transitory computer readable media configured to identify a first video represented based on a first set of image frames. A first subset of image frames can be extracted from the first set of image frames. The first subset of image frames can be compared to one or more image frames associated with a collection of video clusters. It can be determined that at least a threshold quantity of image frames in the first subset matches, within an allowable deviation, at least some image frames associated with a first video cluster included the collection of video clusters. The first video cluster can be defined to include the first video.

In an embodiment, a second video represented based on a second set of image frames can be identified. A second subset of image frames can be extracted from the second set of image frames. The second subset of image frames can be compared to the one or more image frames associated with collection of video clusters. It can be determined that less than the threshold quantity of image frames in the second subset matches, within the allowable deviation, the one or more image frames associated with the collection of video clusters. The second subset of image frames associated with the second video can be stored, at least temporarily, into a data store.

In an embodiment, the second subset of image frames associated with the second video can be compared to a third subset of image frames stored, at least temporarily, in the data store. The third subset of image frames can be extracted from a third set of image frames associated with a third video. It can be determined that at least a threshold number of image frames in the second subset matches, within the allowable deviation, at least some image frames in the third subset of image frames associated with the third video. The second video can be associated with a group of videos including the third video. It can be determined that the group of videos includes at least a specified minimum number of videos. A second video cluster can be defined to include the second video and the third video.

In an embodiment, a fourth set of image frames can be selected to represent the second video cluster. A fourth subset of image frames can be extracted from the fourth set of image frames. Each of a first quantity of image frames in the first subset, a second quantity of image frames in the second subset, and a third quantity of image frames in the third subset can be less than a fourth quantity of image frames in the fourth subset.

In an embodiment, the at least some image frames associated with the first video cluster can include at least a portion of image frames in a second subset of image frames extracted from a second set of image frames representing the first video cluster. A first quantity of image frames in the first subset can be less than a second quantity of image frames in the second subset.

In an embodiment, comparing the first subset of image frames to the one or more image frames associated with the collection of video clusters can further comprise applying one or more image analysis processes to the first subset of image frames.

In an embodiment, the one or more image analysis processes can be associated with at least one of an image hashing algorithm, an image fingerprinting algorithm, an image classification algorithm, or an image clustering algorithm.

In an embodiment, each image frame in the first set of image frames and the at least some image frames can be representable by one or more hash values.

In an embodiment, each image frame in the first subset of image frames can be extracted, from the first set of image frames, at a respectively specified time interval.

In an embodiment, a request to upload the first video can be received. The first video can be identified based on the request to upload the first video. In some cases, a decrease in a relevance ranking of the first video for presentation via a feed can be provided subsequent to receiving the request to upload the first video. In some cases, a connection to the first video cluster can be provided subsequent to receiving the request to upload the first video.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
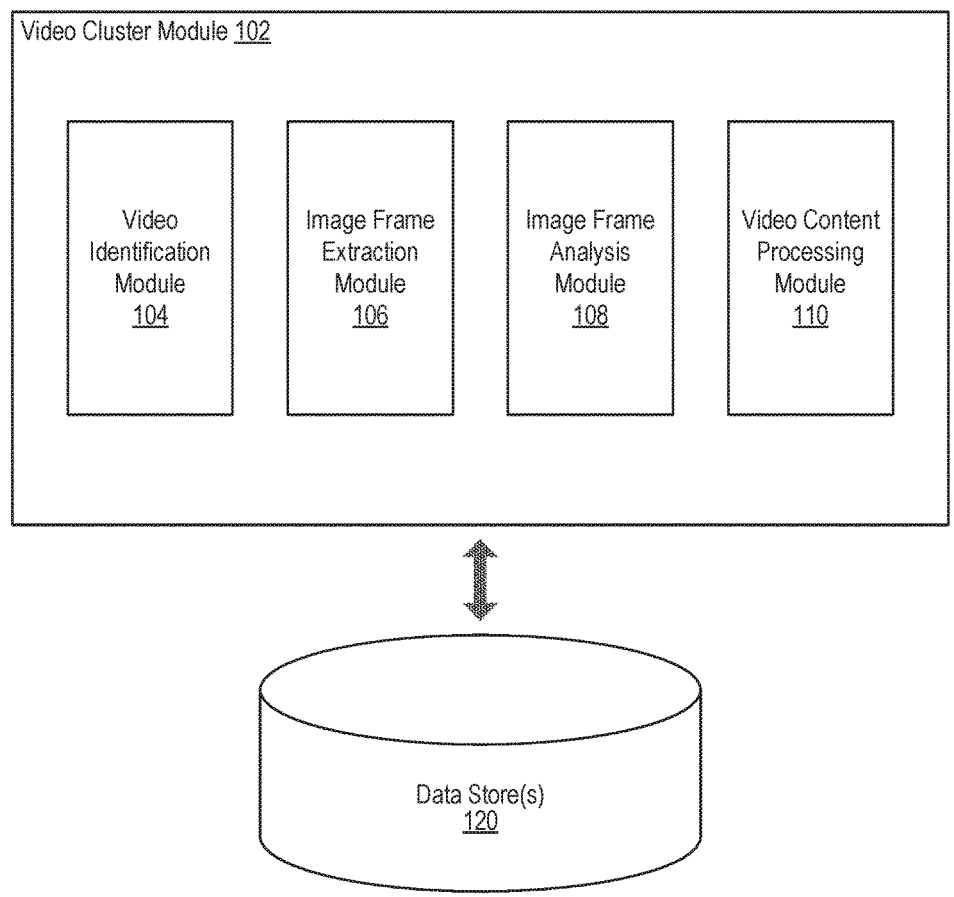
FIG. 1 illustrates an example system including an example video cluster module configured to facilitate defining and analyzing video clusters based on video image frames, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Defining and Analyzing Video Clusters Based on Video Image Frames

People use computing devices (or systems) for a wide variety of purposes. Computing devices can provide different kinds of functionality. Users can utilize their computing devices to produce information, access information, and share information. For example, users can utilize their computing devices to capture media content, such as by recording videos. Every day, such videos can be uploaded to various online services or resources, such as a social networking system (or service).

In some instances, certain videos made available via the social networking system can gain popularity or "virality." Such popular or "viral" videos can be uploaded, shared, distributed, commented upon, liked, or otherwise engaged with by a large audience using the social networking system. However, under conventional approaches, often times unnecessarily large quantities of different users can upload the same (i.e., or substantially the same) video, resulting in needless data transmissions. Also, in accordance with conventional approaches, the same video can be processed and stored numerous times in various formats, which results in undesirable redundancies and inefficiencies in computing and/or storage resource usage. Accordingly, such conventional approaches to video processing can be inefficient, impractical, and undesirable. Due to these and other reasons, conventional approaches can create challenges for or reduce the overall user experience associated with video processing.

Therefore, an improved approach can be beneficial for addressing or alleviating various concerns associated with conventional approaches. The disclosed technology can define and analyze video clusters based on video image frames. In general, a video can be represented based on (i.e., based at least in part on) a set of video image frames, which can also be referred to as image frames, still frames, images, etc. In one example, by comparing at least some of the image frames of multiple videos, the disclosed technology can define different video clusters, each of which being defined to include multiple versions or copies of the same video (i.e., or substantially the same video). Continuing with the example, a newly uploaded video can be compared with the defined video clusters to determine whether or not the newly uploaded video is already represented by a particular video cluster. If so, in this example, the newly uploaded video can be handled more efficiently.

Various embodiments of the present disclosure can identify a first video represented based on a first set of image frames. A first subset of image frames can be extracted from the first set of image frames. The first subset of image frames can be compared to one or more image frames associated with a collection of video clusters. It can be determined that at least a threshold quantity of image frames in the first subset matches, within an allowable deviation, at least some image frames associated with a first video cluster included the collection of video clusters. The first video cluster can be defined to include the first video. It is contemplated that there can be many variations and/or other possibilities.

FIG. 1 illustrates an example system 100 including an example video cluster module 102 configured to facilitate defining and analyzing video clusters based on video image frames, according to an embodiment of the present disclosure. As shown in the example of FIG. 1, the video cluster module 102 can include a video identification module 104, an image frame extraction module 106, an image frame analysis module 108, and a video content processing module 110. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the video cluster module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the video cluster module 102 can be implemented, in part or in whole, as software running on one or more computing devices or systems, such as on a user or client computing device. For example, the video cluster module 102 or at least a portion thereof can be implemented as or within an application (e.g., app), a program, or an applet, etc., running on a user computing device or a client computing system, such as the user device 710 of FIG. 7. In another example, the video cluster module 102 or at least a portion thereof can be implemented using one or more computing devices or systems that include one or more servers, such as network servers or cloud servers. In some instances, the video cluster module 102 can, in part or in whole, be implemented within or configured to operate in conjunction with a social networking system (or service), such as the social networking system 730 of FIG. 7. It should be understood that there can be many variations or other possibilities.

Furthermore, in some embodiments, the video cluster module 102 can be configured to communicate and/or operate with the at least one data store 120, as shown in the example system 100. The at least one data store 120 can be configured to store and maintain various types of data. In some implementations, the at least one data store 120 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, profile information, user locations, user specified settings, content produced or posted by users, and various other types of user data. In some embodiments, the at least one data store 120 can store information that is utilized by the video cluster module 102. For instance, the at least one data store 120 can store information associated with videos and/or video clusters, which can be utilized by the video cluster module 102. It is contemplated that there can be many variations or other possibilities.

As discussed above, each video can generally be represented based on (i.e., based at least in part on) a particular set of image frames combined together sequentially. The video identification module 104 can be configured to facilitate identifying a first video represented based on a first set of image frames. In some cases, a given video can be identified by the video identification module 104. For example, a request to upload a particular video, such as to the social networking system, can be received by the video cluster module 102. The particular video can be represented based on a particular set of image frames. The particular video can correspond to the first video identified by the video identification module 104 and the particular set of image frames can correspond to the first set of image frames. As such, in this example, the first video can be identified, by the video identification module 104, based on the request to upload. It should be appreciated that many variations are possible.

The image frame extraction module 106 can be configured to facilitate extracting a first subset of image frames from the first set of image frames. For instance, a 30-second video recorded at 30 frames per second can be represented based on a set of 900 image frames. The image frame extraction module 106 can, for example, extract a subset of 30 image frames from the set of 900 image frames representing the 30-second video. In some cases, the image frame extraction module 106 can extract each image frame in the subset of image frames, from the set of image frames, at a respectively specified time interval. In this example, the image frame extraction module 106 can extract one image frame for the subset in one-second intervals (e.g., one image frame extracted at every second of the 30-second video). In some implementations, the quantity of image frames in the first subset can correspond to a range of 20 to 30 image frames. In some embodiments, the quantity of image frames can vary based on the length of the first video. For example, longer videos can have more image frames extracted for its respective subset while shorter videos can have less image frames extracted for its respective subset. In some embodiments, however, the quantity of image frames can be maintained across multiple videos. Many variations are possible.

Moreover, the image frame analysis module 108 can be configured to facilitate comparing the first subset of image frames to one or more image frames associated with a collection of video clusters. The collection of video clusters can be represented based on the one or more image frames. The collection of video clusters as well as the one or more image frames can, for example, be stored in the at least one data store 120. The image frame analysis module 108 can also be configured to facilitate determining that at least a threshold quantity of image frames in the first subset matches, within an allowable deviation, at least some image frames associated with a first video cluster included the collection of video clusters. More details regarding the image frame analysis module 108 will be provided below with reference to FIG. 2.

Furthermore, the video content processing module 110 can be configured to facilitate defining the first video cluster to include the first video. For example, subsequent to determining, by the image frame analysis module 108, that at least the threshold quantity of image frames in the first subset matches at least some image frames associated with the first video cluster, the video content processing module 110 can define (e.g., generate, form, redefine, modify a definition of, etc.) the first video cluster to include the first video. As such, the first video can be determined to be the same as (i.e., substantially the same as, substantially similar to, similar within the allowable deviation to, etc.) one or more other videos in the first video cluster, and the first video can be included in or can belong to the first video cluster.

In one example, the first video can be identified based on a received request to upload the first video to the social networking system. In this example, the image frame analysis module 108 can determine that the first video has the threshold quantity of image frames (e.g., at least eight image frames) in its first subset that matches, within the allowable deviation, at least some image frames associated with the first video cluster included the collection of video clusters. It follows that a video that is the same as, or substantially similar to, the first video has already been uploaded or is already existing in the social networking system. Accordingly, the video content processing module 110 can provide, subsequent to receiving the request to upload the first video, a connection to the first video cluster. In some instances, the connection (e.g., link, association, etc.) to the first video cluster can be provided instead of enabling the first video to be redundantly uploaded, processed (e.g., encoded), and/or stored. Additionally or alternatively, the video content processing module 110 can provide, subsequent to receiving the request to upload the first video, a decrease in a relevance ranking of the first video for presentation via a feed. For example, if the first video is to be surfaced via the feed (e.g., a social networking system newsfeed), then the first video can be down-ranked since a same or substantially similar version of the first video is already within the social networking system. It should be understood that this example is provided for illustrative purposes and that there can be many variations and/or other possibilities.

Furthermore, in some embodiments, the video identification module 104 can identify a second video represented based on a second set of image frames. The second video can, for instance, correspond to a new video to be uploaded to the social networking system. The image frame extraction module 106 can extract a second subset of image frames (e.g., 20 to 30 image frames) from the second set of image frames. The image frame analysis module 108 can compare the second subset of image frames to the one or more image frames associated with collection of video clusters. In some cases, the image frame analysis module 108 can determine that less than the threshold quantity of image frames in the second subset matches, within the allowable deviation, the one or more image frames associated with the collection of video clusters. For example, a video that is the same as or substantially similar to the second video does not exist in the social networking system. As such, the video content processing module 110 can store, at least temporarily, the second subset of image frames associated with the second video into a data store, such as a pool for unclustered (e.g., yet to be clustered) videos. In some cases, other unclustered videos in the pool can be compared with the second video to determine whether or not a new video cluster should be defined, formed, or created based on the second video and the other unclustered videos. Again, many variations are possible.

Figure 2:
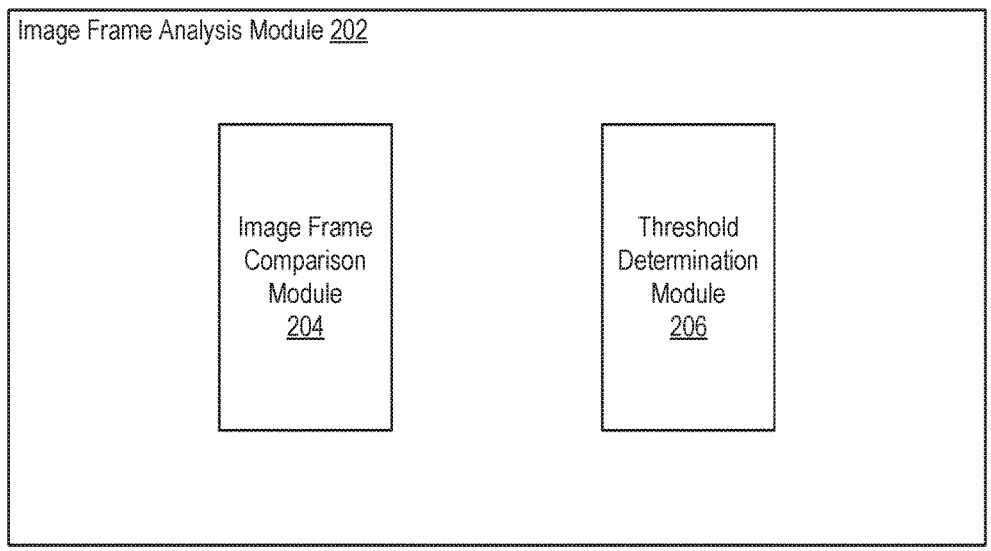
FIG. 2 illustrates an example image frame analysis module configured to facilitate defining and analyzing video clusters based on video image frames, according to an embodiment of the present disclosure.

FIG. 2 illustrates an example image frame analysis module 202 configured to facilitate defining and analyzing video clusters based on video image frames, according to an embodiment of the present disclosure. In some embodiments, the image frame analysis module 108 of FIG. 1 can be implemented as the example image frame analysis module 202. As shown in FIG. 2, the image frame analysis module 202 can include an image frame comparison module 204 and a threshold determination module 206.

The image frame analysis module 202 can utilize the image frame comparison module 204 to facilitate comparing a first subset of image frames associated with a first video to one or more image frames associated with a collection of video clusters. In some implementations, the image frame comparison module 204 can be configured to compare each image frame in the first subset to the one or more image frames associated with the collection of video clusters to determine whether or not each image frame in the first subset matches (i.e., substantially matches, matches within an allowable deviation, is the same as, is substantially similar to, etc.) at least some of the one or more image frames associated with the collection of video clusters.

In some cases, the image frame comparison module 204 can compare the first subset of image frames to the one or more image frames associated with the collection of video clusters by applying one or more image analysis processes to the first subset of image frames. Based on the one or more image analysis processes, the image frame comparison module 204 can determine whether an image frame in the first subset matches at least some of the image frames associated with the collection of video clusters. In some implementations, the one or more image analysis processes can be associated with at least one of an image hashing algorithm, an image fingerprinting algorithm, an image classification algorithm, or an image clustering algorithm.

In one instance, each image frame in the first set of image frames and the at least some image frames are representable by one or more hash values. In this instance, a hash function can be applied to each of the image frames in order to generate its respective hash value (i.e., hash code, hash sum, hash, etc.). Accordingly, each of the image frames can be represented by its hash value. The image frame comparison module 204 can then compare two particular image frames by comparing their respective hash values. If their respective hash values match within the allowable deviation, then the two particular image frames can be considered to be the same or substantially similar.

Moreover, the image frame analysis module 202 can utilize the threshold determination module 206 to facilitate determining that at least a threshold quantity of image frames in the first subset matches, within the allowable deviation, at least some image frames associated with a first video cluster included the collection of video clusters. In one example, the threshold quantity can be specified to correspond to at least 10 image frames. In this example, if the threshold determination module 206 determines that the first video has at least 10 image frames in the first subset that matches image frames associated with the first video cluster, then the first video can be considered to be associated with, belonging to, or representable by the first video cluster. As discussed previously, the first video cluster can then be defined (e.g., redefined) to include the first video.

Furthermore, in some embodiments, the image frame comparison module 204 can compare a second subset of image frames associated with a second video to a third subset of image frames stored, at least temporarily, in a data store. This comparison can occur, for instance, at one or more specified times (e.g., every 30 minutes). The second video can be represented based on a second set of image frames from which the second subset is extracted. Also, the third subset of image frames can be extracted from a third set of image frames associated with a third video. Further, the data store can correspond to a pool for storing one or more unclustered (e.g., yet to be clustered) videos and/or their associated image frames.

In some implementations, the threshold determination module 206 can also be configured to facilitate determining that at least a threshold number of image frames in the second subset matches, within the allowable deviation, at least some image frames in the third subset of image frames associated with the third video. As such, the second video can be considered to be associated with, belonging to, and/or clustered with a group of videos including the third video. If the threshold determination module 206 determines that the group of videos includes at least a specified minimum number of videos, then a second video cluster can be defined (e.g., by the video content processing module 110 of FIG. 1) to include the second video and the third video. These determinations can occur, for example, at one or more specified times. Furthermore, in some instances, one or more images frames (e.g., up to 200 image frames) can be extracted from the second video cluster to represent the second video cluster and/or the videos within the second video cluster (including the second and third videos). Additionally, in some cases, each video cluster in the collection of video clusters can be defined, generated, and/or developed based on the above approach.

Moreover, in some cases, the threshold quantity of image frames in the first subset that matches the at least some image frames associated with the first video cluster can be greater than the threshold number of image frames in the second subset that matches the at least some image frames in the third subset of image frames associated with the third video. In one example, the threshold quantity can be set to at least 10 image frames whereas the threshold number can be set to at least five image frames. In this example, the specified minimum number of videos for the group can be set to four. It should be appreciated that this example is provided for illustrative purposes, that any suitable quantity or number of image frames can be used for the thresholds, that any suitable quantity or number of videos can be used for the specified minimum number, and that many variations are possible.

Figure 3:
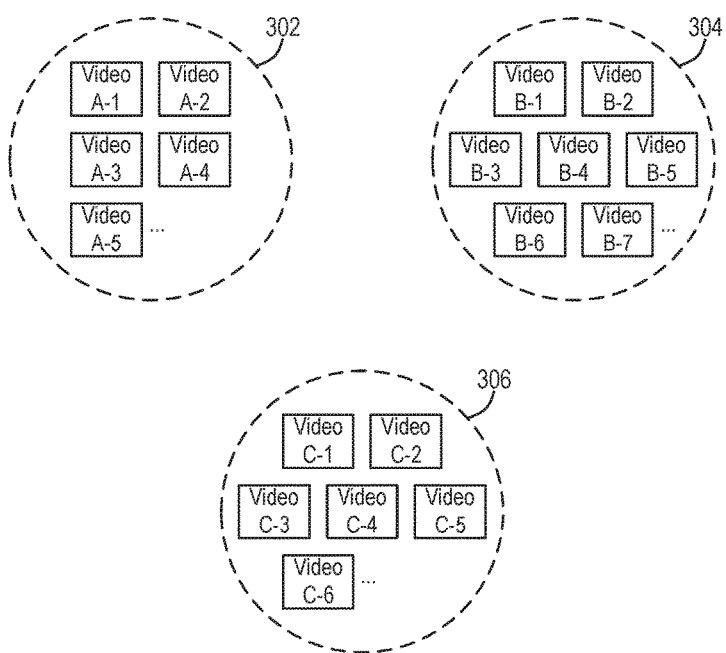
FIG. 3 illustrates an example representation of video clusters that are definable and analyzable based on video image frames, according to an embodiment of the present disclosure.

FIG. 3 illustrates an example representation 300 of video clusters that are definable and analyzable based on video image frames, according to an embodiment of the present disclosure. The example representation 300 illustrates a first video cluster 302 (e.g., Video Cluster A), a second video cluster 304 (e.g., Video Cluster B), and a third video cluster 306 (e.g., Video Cluster C).

In this example representation 300, Video A-1, Video A-2, Video A-3, Video A-4, and Video A-5, etc., have been determined, based on their representative image frames, to be the same as (i.e., substantially similar to) one another. As such, Video A-1 through Video A-5 can be clustered together in Video Cluster A 302. Likewise, Videos B-1, Video B-2, Video B-3, Video B-4, Video B-5, Video B-6, and Video B-7, etc., have been determined to be the same as each another and can thus be clustered together in Video Cluster B 304. Similarly, Videos C-1, Video C-2, Video C-3, Video C-4, Video C-5, and Video C-6, etc., are the same and thus clustered together in Video Cluster C 306. Furthermore, a first set of image frames can be extracted from one of the videos in Video Cluster A 302 to represent Video Cluster A 302 (and/or Video A-1 through Video A-5). A second set of image frames can be extracted to represent Video Cluster B 304. A third set of image frames can be extracted to represent Video Cluster C.

If a new video to be uploaded is determined to have image frames that match the first set, then the new video can be associated with (e.g., belong to, be included in, be clustered in, be represented by, etc.) Video Cluster A 302. Likewise, if the new video matches the second set, then the new video can be associated with Video Cluster B 304. Similarly, if the new video matches the third set, then the new video can be associated with Video Cluster B 304. If the new video matches one of the video clusters, then the new video does not necessarily need to be uploaded. Instead, a connection to the matching video cluster can be provided. Also, if the new video is to be surfaced or presented in a feed, then the new video can be down-ranked since same versions or substantially similar versions of the new video are already present. If, however, the new video does not match any video clusters, then a new cluster can potentially be formed. It is contemplated that there can be many variations and other possibilities.

Figure 4:
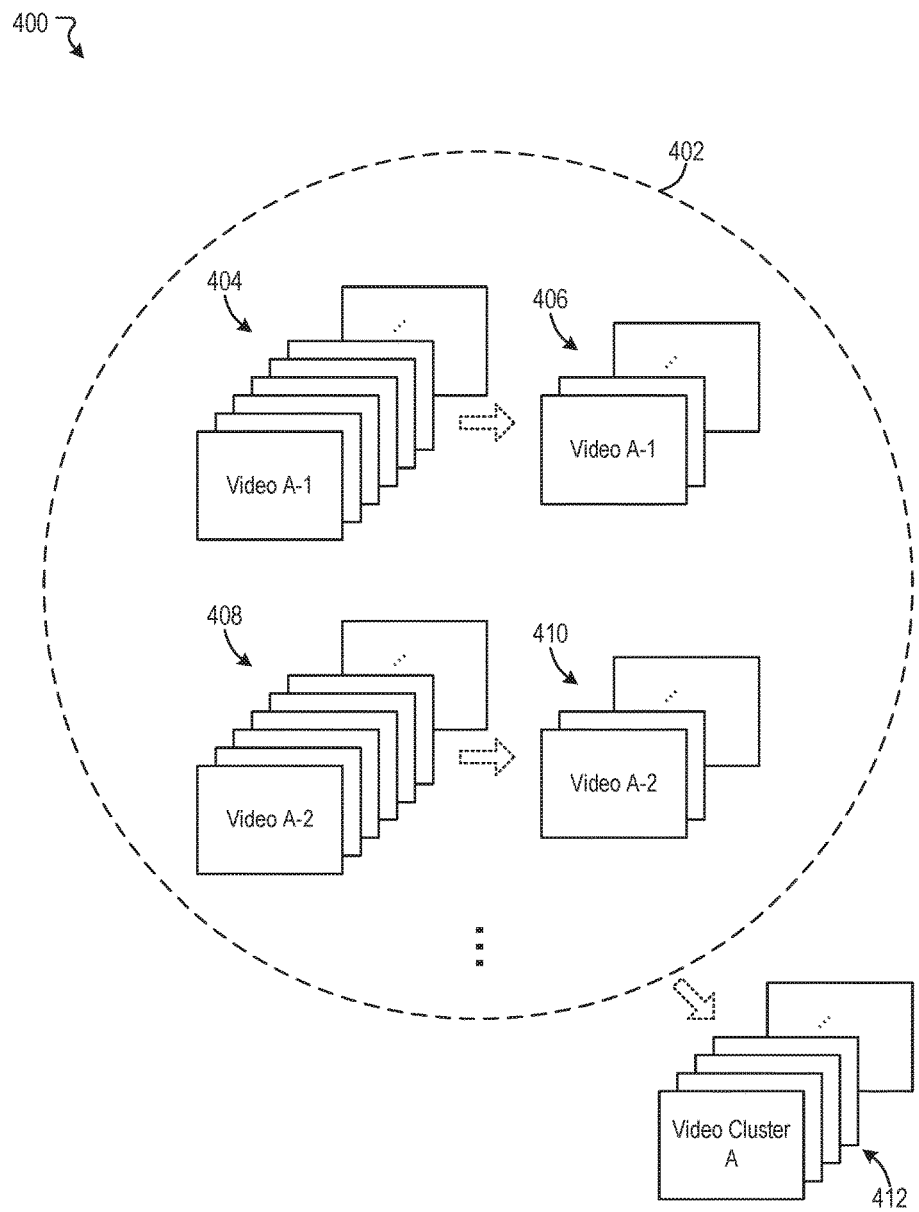
FIG. 4 illustrates an example representation of a video cluster that is definable and analyzable based on video image frames, according to an embodiment of the present disclosure.

FIG. 4 illustrates an example representation 400 of a video cluster that is definable and analyzable based on video image frames, according to an embodiment of the present disclosure. The example representation 400 illustrates a video cluster (e.g., Video Cluster A) 402. As shown in the example of FIG. 4, Video Cluster A 402 can be defined to include, but is not limited to, a first video (e.g., Video A-1) as well as a second video (e.g., Video A-2). The first video can be represented based on a first set of image frames 404 and the second video can be represented based on a second set of image frames 408.

As shown, a first subset of image frames 406 can be extracted from the first set of image frames 404 and a second subset of image frames 410 can be extracted from the second set of image frames 408. Moreover, subsequent to defining Video Cluster A 402, Video Cluster A 402 can be analyzed and a set of image frames 412 can be extracted to represent Video Cluster A 402. It should be appreciated that many variations are possible.

Figure 5:
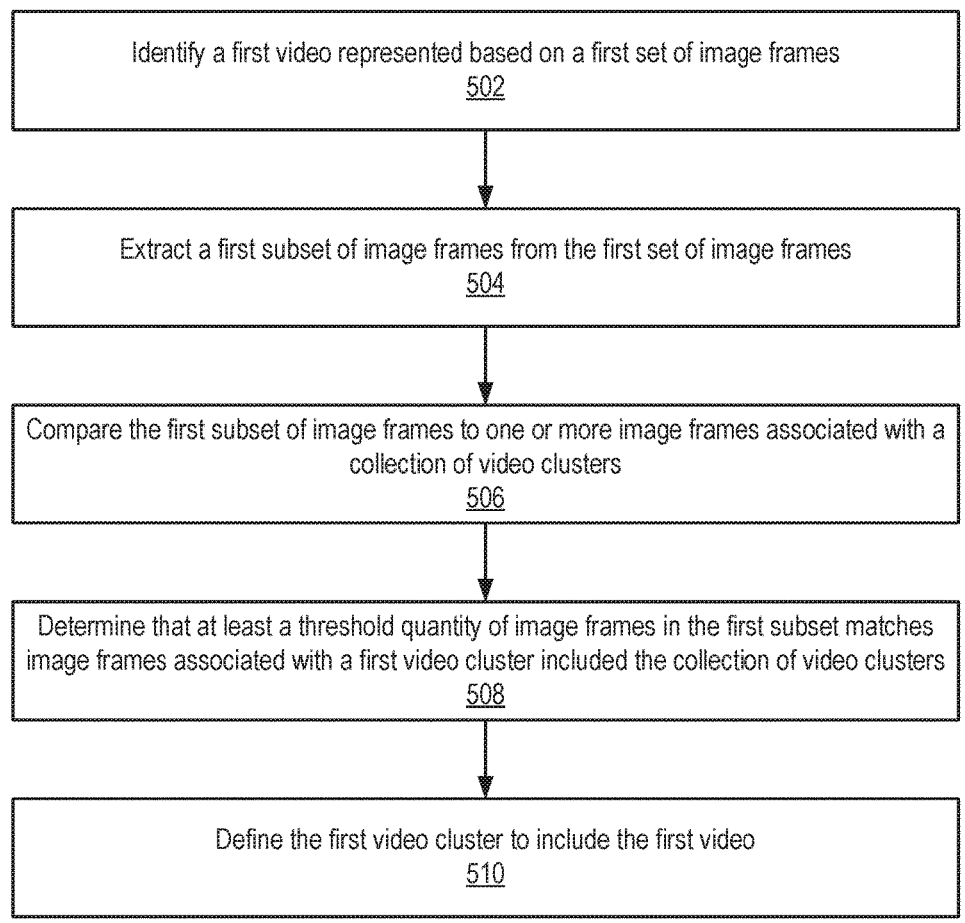
FIG. 5 illustrates an example method associated with defining and analyzing video clusters based on video image frames, according to an embodiment of the present disclosure.

FIG. 5 illustrates an example method 500 associated with defining and analyzing video clusters based on video image frames, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can identify a first video represented based on a first set of image frames. At block 504, the example method 500 can extract a first subset of image frames from the first set of image frames. At block 506, the example method 500 can compare the first subset of image frames to one or more image frames associated with a collection of video clusters. At block 508, the example method 500 can determine that at least a threshold quantity of image frames in the first subset matches, within an allowable deviation, at least some image frames associated with a first video cluster included the collection of video clusters. At block 510, the example method 500 can define the first video cluster to include the first video.

Figure 6A:
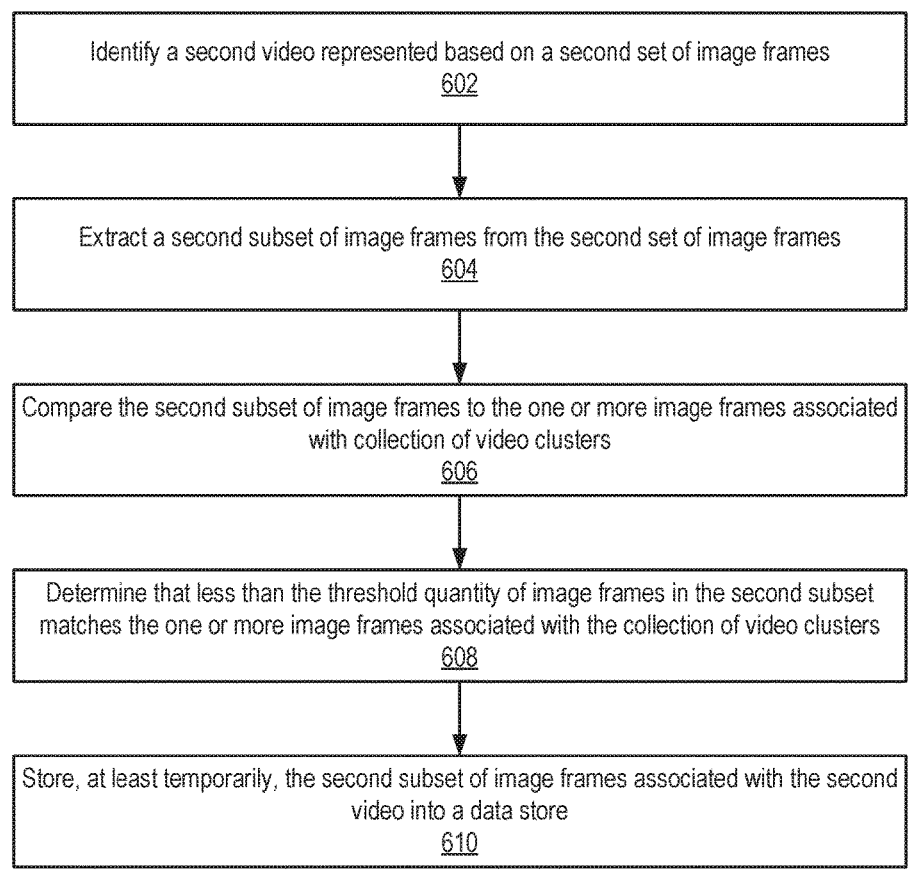
FIG. 6A illustrates an example method associated with defining and analyzing video clusters based on video image frames, according to an embodiment of the present disclosure.

FIG. 6A illustrates an example method 600 associated with defining and analyzing video clusters based on video image frames, according to an embodiment of the present disclosure. As discussed above, it should be appreciated that there can be additional, fewer, or alternative steps performed in similar or alternative orders, or in parallel, within the scope of the various embodiments unless otherwise stated.

At block 602, the example method 600 can identify a second video represented based on a second set of image frames. At block 604, the example method 600 can extract a second subset of image frames from the second set of image frames. At block 606, the example method 600 can compare the second subset of image frames to the one or more image frames associated with collection of video clusters. At block 608, the example method 600 can determine that less than the threshold quantity of image frames in the second subset matches, within the allowable deviation, the one or more image frames associated with the collection of video clusters. At block 610, the example method 600 can store, at least temporarily, the second subset of image frames associated with the second video into a data store.

Figure 6B:
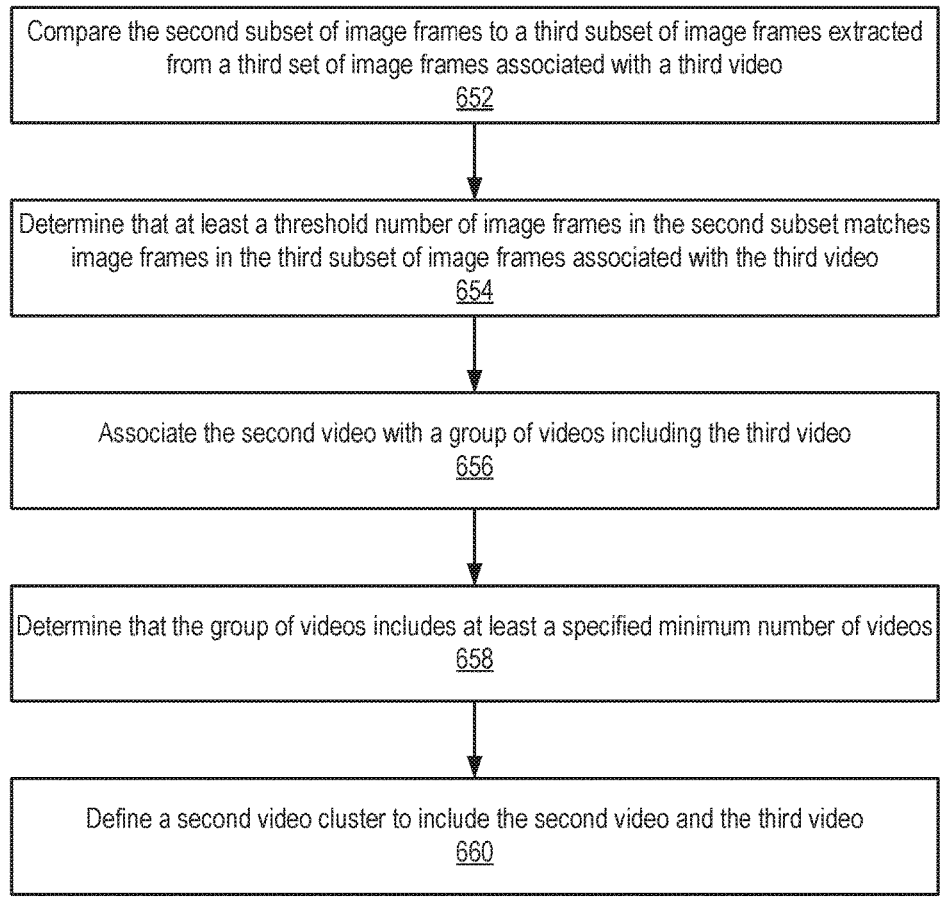
FIG. 6B illustrates an example method associated with defining and analyzing video clusters based on video image frames, according to an embodiment of the present disclosure.

FIG. 6B illustrates an example method 650 associated with defining and analyzing video clusters based on video image frames, according to an embodiment of the present disclosure. Again, it should be appreciated that there can be additional, fewer, or alternative steps performed in similar or alternative orders, or in parallel, within the scope of the various embodiments unless otherwise stated.

At block 652, the example method 650 can compare the second subset of image frames associated with the second video to a third subset of image frames stored, at least temporarily, in the data store. The third subset of image frames can be extracted from a third set of image frames associated with a third video. At block 654, the example method 650 can determine that at least a threshold number of image frames in the second subset matches, within the allowable deviation, at least some image frames in the third subset of image frames associated with the third video. At block 656, the example method 650 can associate the second video with a group of videos including the third video. At block 658, the example method 650 can determine that the group of videos includes at least a specified minimum number of videos. At block 660, the example method 650 can define a second video cluster to include the second video and the third video.

In some embodiments, a fourth set of image frames can be selected to represent the second video cluster. A fourth subset of image frames can be extracted from the fourth set of image frames. Each of a first quantity of image frames in the first subset, a second quantity of image frames in the second subset, and a third quantity of image frames in the third subset can be less than a fourth quantity of image frames in the fourth subset. For example, each of the first quantity, the second quantity, and the third quantity can include 20 to 30 image frames, whereas the fourth quantity can include up to 200 image frames (or more). It should be understood that this example is provided for illustrative purposes and that any suitable quantity or number of images frames can be utilized for the first, second, third, and fourth quantities.

In some embodiments, the at least some image frames associated with the first video cluster can include at least a portion of image frames in a second subset of image frames extracted from a second set of image frames representing the first video cluster. A first quantity of image frames in the first subset can be less than a second quantity of image frames in the second subset. For instance, the first quantity can include 20 to 30 image frames, while the second quantity can include up to 200 image frames (or more).

In some embodiments, a particular video can also incorporate a particular audio stream. In some implementations, the particular video can also be compared to the collection of video clusters based on (i.e., based at least in part on) comparing the particular audio stream and one or more audio streams of the video clusters.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
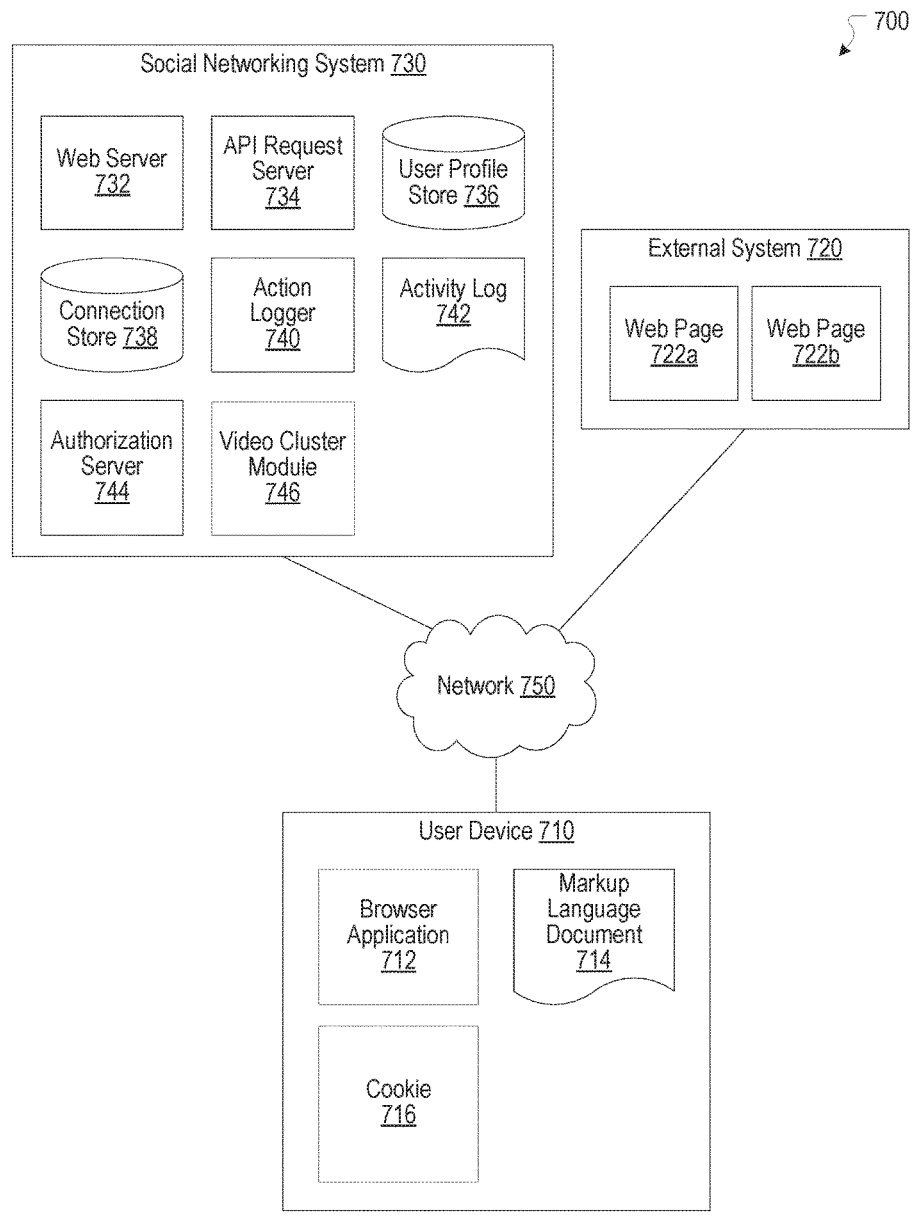
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system

720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a video cluster module 746. The video cluster module 746 can, for example, be implemented as the video cluster module 102 of FIG. 1. As discussed previously, it should be appreciated that there can be many variations or other possibilities. For example, in some instances, the video cluster module 746 (or at least a portion thereof) can be included in the user device 710. Other features of the video cluster module 746 are discussed herein in connection with the video cluster module 102.

Hardware Implementation

Figure 8:
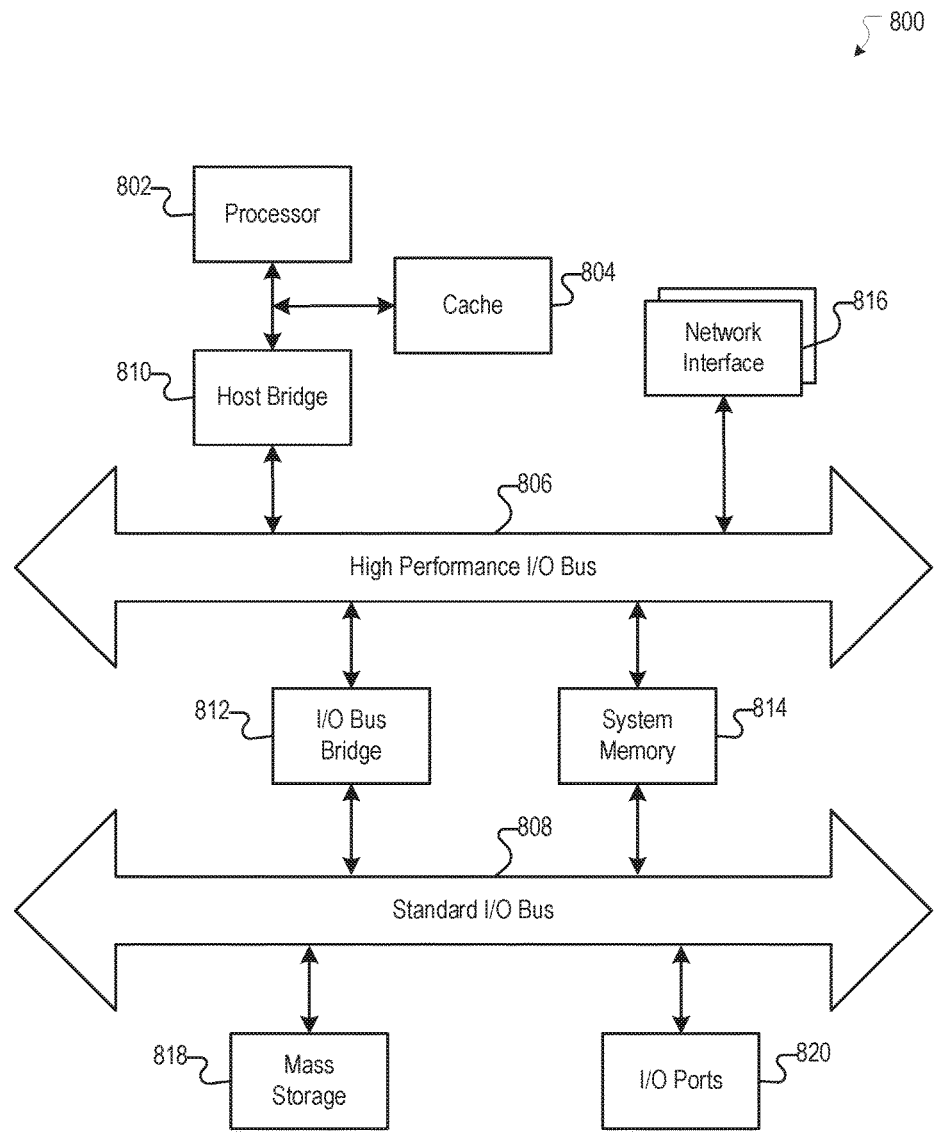
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   identifying, by a computing system, a first video associated with a first set of image frames, wherein the first video is uploaded by a user for presentation in a feed;
   comparing, by the computing system, a first subset of image frames from the first set of image frames to one or more image frames associated with a collection of video clusters, wherein each image frame in the first subset of image frames is extracted from the set of image frames at a specified, regular time interval, and the specified, regular time interval is determined based on a length of the first video; and
   associating, by the computing system, the first video with a first video cluster of the collection of video clusters based on a determination that at least a threshold quantity of image frames in the first subset of image frames matches one or more image frames associated with the first video cluster.

2. The computer-implemented method of claim 1, further comprising:
   identifying a second video associated with a second set of image frames;
   comparing a second subset of image frames from the second set of image frames to the one or more image frames associated with collection of video clusters; and
   storing the second set of image frames into a data store based on a determination that less than a threshold quantity of image frames in the second subset of image frames matches the one or more image frames associated with the collection of video clusters.

3. The computer-implemented method of claim 2, further comprising:
   comparing the second subset of image frames associated with the second video to a third subset of image frames stored in the data store, wherein the third subset of image frames is extracted from a third set of image frames associated with a third video;
   determining that at least a threshold quantity of image frames in the second subset matches at least some image frames in the third subset of image frames associated with the third video;
   associating the second video with a group of videos including the third video;
   determining that the group of videos includes at least a specified minimum number of videos; and
   defining a second video cluster that includes the second video and the third video.

4. The computer-implemented method of claim 3, further comprising:
   selecting a fourth set of image frames to represent the second video cluster; and
   extracting a fourth subset of image frames from the fourth set of image frames,
   wherein each of a first quantity of image frames in the first subset, a second quantity of image frames in the second subset, and a third quantity of image frames in the third subset is less than a fourth quantity of image frames in the fourth subset.

5. The computer-implemented method of claim 1, further comprising:
   decreasing a relevance ranking of the first video for presentation in the feed based on inclusion of the first video in the first video cluster.

6. The computer-implemented method of claim 1, wherein comparing the first subset of image frames to the one or more image frames associated with the collection of video clusters further comprises applying one or more image analysis processes to the first subset of image frames.

7. The computer-implemented method of claim 6, wherein the one or more image analysis processes is associated with at least one of an image hashing algorithm, an image fingerprinting algorithm, an image classification algorithm, or an image clustering algorithm.

8. The computer-implemented method of claim 1, wherein each image frame in the first set of image frames and the one or more image frames associated with the collection of video clusters are representable by one or more hash values.

9. The computer-implemented method of claim 1, wherein the specified, regular time interval is determined based on a length of the first video so that the first subset of image frames comprises between 20 to 30 image frames.

10. A system comprising:
    at least one processor; and
    a memory storing instructions that, when executed by the at least one processor, cause the system to perform:
    identifying a first video associated with a first set of image frames, wherein the first video is uploaded by a user for presentation in a feed;

comparing a first subset of image frames from the first set of image frames to one or more image frames associated with a collection of video clusters, wherein each image frame in the first subset of image frames is extracted from the set of image frames at a specified, regular time interval, and the specified, regular time interval is determined based on a length of the first video; and associating the first video with a first video cluster of the collection of video clusters based on a determination that at least a threshold quantity of image frames in the first subset of image frames matches one or more image frames associated with the first video cluster.

11. The system of claim 10, wherein the instructions cause the system to further perform:
identifying a second video associated with a second set of image frames;
comparing a second subset of image frames from the second set of image frames to the one or more image frames associated with collection of video clusters; and
storing the second set of image frames into a data store based on a determination that less than a threshold quantity of image frames in the second subset of image frames matches the one or more image frames associated with the collection of video clusters.

12. The system of claim 11, wherein the instructions cause the system to further perform:
comparing the second subset of image frames associated with the second video to a third subset of image frames stored in the data store, wherein the third subset of image frames is extracted from a third set of image frames associated with a third video;
determining that at least a threshold quantity of image frames in the second subset matches at least some image frames in the third subset of image frames associated with the third video;
associating the second video with a group of videos including the third video;
determining that the group of videos includes at least a specified minimum number of videos; and
defining a second video cluster that includes the second video and the third video.

13. The system of claim 12, wherein the instructions cause the system to further perform:
selecting a fourth set of image frames to represent the second video cluster; and
extracting a fourth subset of image frames from the fourth set of image frames,
wherein each of a first quantity of image frames in the first subset, a second quantity of image frames in the second subset, and a third quantity of image frames in the third subset is less than a fourth quantity of image frames in the fourth subset.

14. The system of claim 10, wherein the instructions cause the system to further perform:
decreasing a relevance ranking of the first video for presentation in the feed based on inclusion of the first video in the first video cluster.

15. A non-transitory computer-readable storage medium including instructions that, when executed by at least one processor of a computing system, cause the computing system to perform:
identifying a first video associated with a first set of image frames, wherein the first video is uploaded by a user for presentation in a feed;
comparing a first subset of image frames from the first set of image frames to one or more image frames associated with a collection of video clusters, wherein each image frame in the first subset of image frames is extracted from the set of image frames at a specified, regular time interval, and the specified, regular time interval is determined based on a length of the first video; and associating the first video with a first video cluster of the collection of video clusters based on a determination that at least a threshold quantity of image frames in the first subset of image frames matches one or more image frames associated with the first video cluster.

16. The non-transitory computer-readable storage medium of claim 15, wherein the instructions cause the computing system to further perform:
identifying a second video associated with a second set of image frames;
comparing a second subset of image frames from the second set of image frames to the one or more image frames associated with collection of video clusters; and
storing the second set of image frames into a data store based on a determination that less than a threshold quantity of image frames in the second subset of image frames matches the one or more image frames associated with the collection of video clusters.

17. The non-transitory computer-readable storage medium of claim 16, wherein the instructions cause the computing system to further perform:
comparing the second subset of image frames associated with the second video to a third subset of image frames stored in the data store, wherein the third subset of image frames is extracted from a third set of image frames associated with a third video;
determining that at least a threshold quantity of image frames in the second subset matches at least some image frames in the third subset of image frames associated with the third video;
associating the second video with a group of videos including the third video;
determining that the group of videos includes at least a specified minimum number of videos; and
defining a second video cluster that includes the second video and the third video.

18. The non-transitory computer-readable storage medium of claim 17, wherein the instructions cause the computing system to further perform:
selecting a fourth set of image frames to represent the second video cluster; and
extracting a fourth subset of image frames from the fourth set of image frames,
wherein each of a first quantity of image frames in the first subset, a second quantity of image frames in the second subset, and a third quantity of image frames in the third subset is less than a fourth quantity of image frames in the fourth subset.

19. The non-transitory computer-readable storage medium of claim 15, wherein the instructions cause the computing system to further perform:
decreasing a relevance ranking of the first video for presentation in the feed based on inclusion of the first video in the first video cluster.

* * * * *